United States Patent
Feldman et al.

(10) Patent No.: US 7,121,699 B2
(45) Date of Patent: Oct. 17, 2006

(54) CONTROL PANEL WITH LIGHT SOURCE FOR CONTROL ILLUMINATION

(75) Inventors: Mark G. Feldman, Farmington Hills, MI (US); Robert Mark Schmidt, Livonia, MI (US)

(73) Assignee: Lear Corporation, Southfield, MI (US)

( * ) Notice: Subject to any disclaimer, the term of this patent is extended or adjusted under 35 U.S.C. 154(b) by 108 days.

(21) Appl. No.: 10/946,893

(22) Filed: Sep. 22, 2004

(65) Prior Publication Data

US 2006/0062007 A1 Mar. 23, 2006

(51) Int. Cl.
*B60Q 1/00* (2006.01)

(52) U.S. Cl. .................. 362/488; 362/504; 362/85; 362/501

(58) Field of Classification Search .................. 362/85, 362/487, 504, 501, 488
See application file for complete search history.

(56) References Cited

U.S. PATENT DOCUMENTS

| | | |
|---|---|---|
| 3,072,782 A * | 1/1963 | Sheeley ....................... 362/85 |
| 3,452,190 A | 6/1969 | Senseman |
| 4,310,871 A | 1/1982 | Adachi |
| 4,670,819 A * | 6/1987 | Boerema et al. ............ 362/501 |
| 5,025,352 A | 6/1991 | Brown |
| 5,055,977 A * | 10/1991 | Acquanetta ................... 362/23 |
| 5,297,010 A | 3/1994 | Camarota et al. |
| 5,521,342 A | 5/1996 | Bartley et al. |
| 5,537,300 A | 7/1996 | Kraines et al. |
| 5,599,086 A | 2/1997 | Dutta |
| 6,000,822 A | 12/1999 | Polizzi et al. |
| 6,536,825 B1 * | 3/2003 | McAndrew et al. ...... 296/37.13 |
| 6,594,417 B1 | 7/2003 | Hulse |
| 6,652,128 B1 | 11/2003 | Misaras |
| 6,932,485 B1 * | 8/2005 | Hussaini et al. .............. 362/85 |
| 2002/0101738 A1 | 8/2002 | Misaras |
| 2004/0017687 A1 | 1/2004 | Misaras |
| 2004/0062054 A1 | 4/2004 | Sturt et al. |
| 2006/0056180 A1 | 3/2006 | Feldman et al. |

* cited by examiner

*Primary Examiner*—Renee Luebke
*Assistant Examiner*—Zahra I. Bennett
(74) *Attorney, Agent, or Firm*—Wildman, Harrold, Allen & Dixon LLP

(57) ABSTRACT

A control illumination apparatus having at least one control and a movable cover positionable over the at least one control. At least one light source is connected to the cover and illuminates an exterior surface of the at least one control with the cover in an open position.

19 Claims, 1 Drawing Sheet

CONTROL PANEL WITH LIGHT SOURCE FOR CONTROL ILLUMINATION

FIELD OF THE INVENTION

This invention relates generally to automobile control panels. In particular, this invention relates to control panels having light sources for illuminating the controls.

SUMMARY OF THE INVENTION

The present invention relates to a control illumination apparatus having at least one control and a movable cover positionable over the at least one control. At least one light source is connected to the cover and illuminates an exterior surface of the at least one control with the cover in an open position.

The present invention also relates to a method for illuminating a set of controls that comprises the steps of providing a movable cover positionable over the set of controls, providing at least one light source that is connected to the cover, and illuminating an exterior surface of the set of controls with the at least one light source with the cover in an open position.

DETAILED DESCRIPTION

Figure 1:
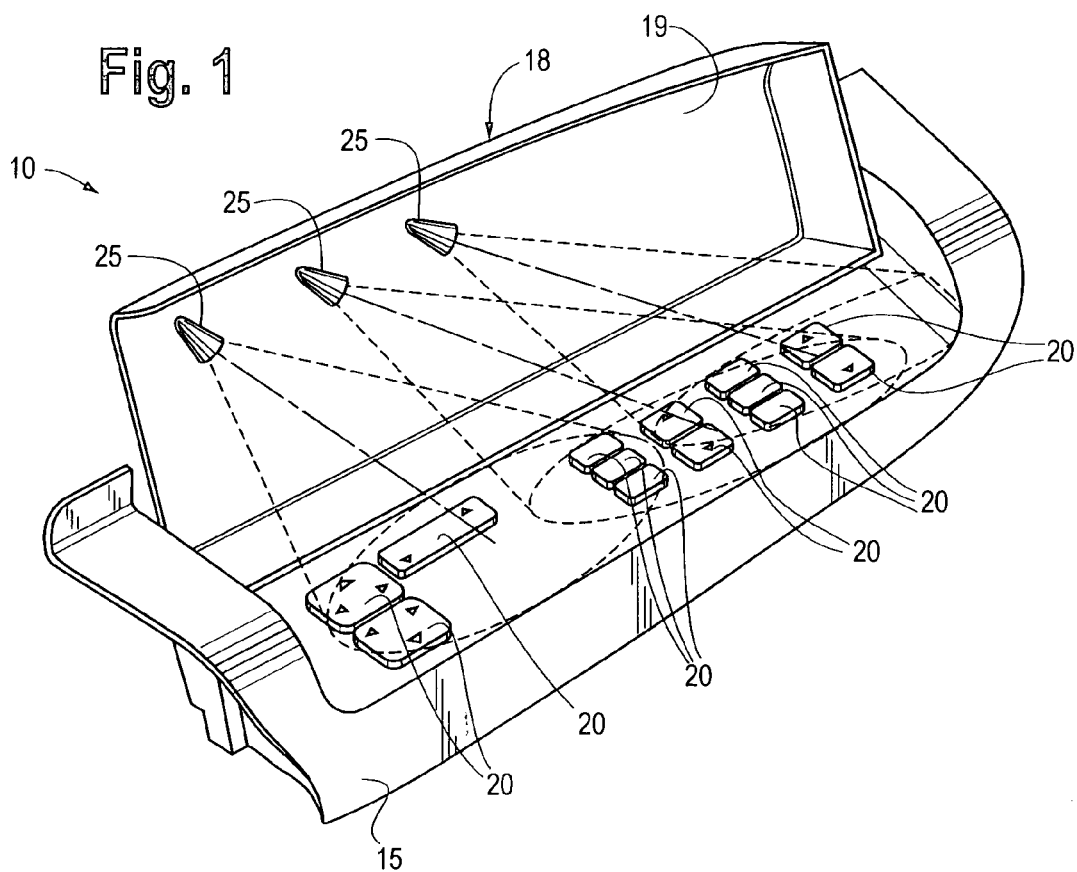
FIG. 1 is a perspective view of an automobile arm rest with a control illumination apparatus according to the present invention.

Referring to FIG. 1, an exemplary control illumination apparatus (shown generally at 10) is shown as it would be used in an automobile arm rest 15 having a set of controls 20 mounted within or on the arm rest 15 and a cover 18 movably connected to the arm rest 15 and positionable over the controls 20. Although the control illumination apparatus is described herein in relation to an arm rest with controls set in the arm rest and a cover positionable over the controls, it will be understood that the present invention could be adapted for use with any covered controls where illumination of the controls is desired. For example, the controls could be mounted directly to an interior trim panel, such as a door panel or ceiling trim, without an arm rest. The design of the interior trim of the automobile and placement of controls and cover within such interior trim are well known in the art and are not discussed in detail herein.

Figure 2:
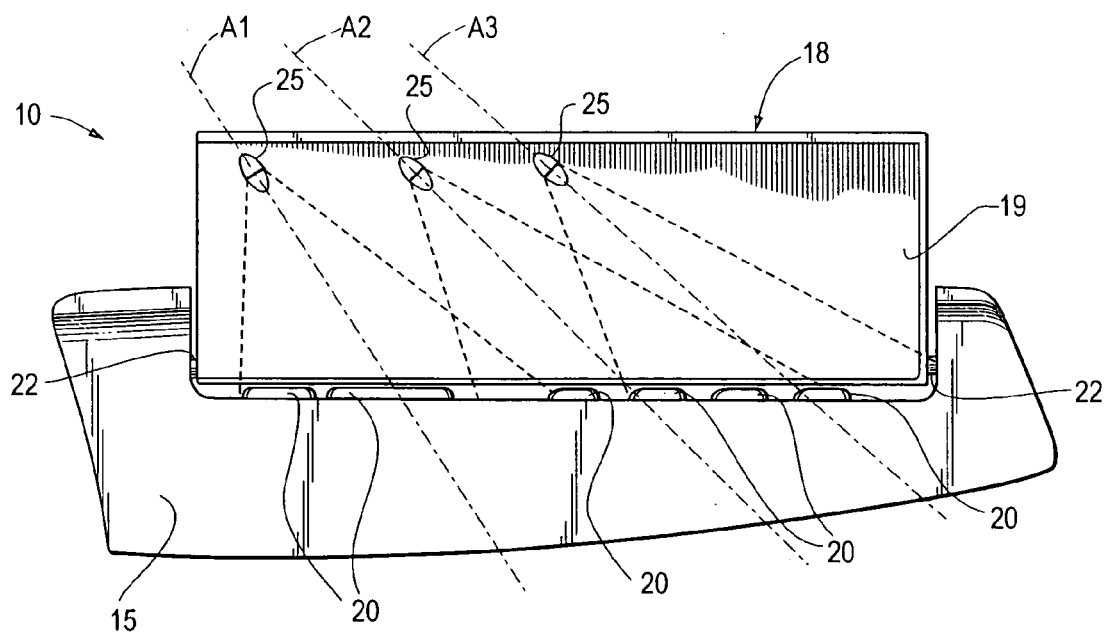
FIG. 2 is a side view of the arm rest of FIG. 1.

Referring to FIGS. 1 and 2, cover 18 is connected to the arm rest 15 by a set of pins 22 that protrude from the ends of cover 18 (see FIG. 2) and are received within openings (not shown) in arm rest 15. Cover 18 is rotatable about pins 22 such that cover 18 is positioned over controls 20 when closed and allows access to controls 20 when rotated to an open position.

Three light sources 25 are mounted within the cover 18, such that they are generally hidden from view from the passengers in the automobile and do not produce unwanted glare from the windows of the automobile. This can be done by mounting light sources 25 within cover 18 such that they are generally aligned with an opening (not shown) formed in the bottom 19 of cover 18, by positioning light sources 25 within an opening (not shown) in the bottom 19 of cover 18, by integrally forming light sources 25 with cover 18, or by mounting light sources 25 in any other well know method appropriate for the desired light source type and desired application. In addition, although the use of three light sources 25 is described, it will be understood that any number of light sources 25 could be used depending on the number and layout of controls 20 and the light pattern projected by light sources 25.

Preferably, light sources 25 are direct light sources such as light emitting diodes (LEDs) due to their direct illumination, small size, their ability to provide directed illumination, and their low heat generation characteristics. Alternatively, light sources 25 could be incandescent lamps or any other light source capable of providing illumination of controls 20.

Light sources 25 are connected to a power source (not shown), such as a battery or the electrical system of the automobile, to provide power to light sources 25. In addition, light sources 25 could also be connected to a switching mechanism that would allow light sources 25 to be turned off when cover 18 is in a closed position and turned on when cover 18 is in an open position (as shown in FIGS. 1 and 2). For example, a plunger switch could be mounted within the arm rest and connected between the power source and light sources 25. When cover 18 is in a closed position, the bottom 19 of cover 18 would depress the plunger switch and turn off light sources 25. When cover 18 is moved to an open position, cover 18 would release the plunger switch and turn on light sources 25.

As seen in FIG. 1, each light source 25 projects illumination on the exterior surfaces of controls 20 in a predetermined light pattern when cover 18 is in an open position. The predetermined light pattern is preferably elliptical to illuminate controls 20 without producing extraneous illumination, but could be any other pattern desired, such as circular, rectangular, etc. The light patterns of light sources 25 overlap so that if one light source is blocked, the overlapping coverage of another light source will illuminate at least a portion of the area that was illuminated by the blocked light source.

As can best be seen in FIG. 2, the elliptical light pattern is produced by providing a horizontal offset between light sources 25 and the controls 20 that they illuminate such that the axis of illumination of each light source (shown as A1–A3) forms a predetermined angle from vertical. Preferably, this predetermined angle is approximately 45 degrees, but could be any angle between approximately 35 and 55 degrees and would provide the desired result. Alternatively, the predetermined light pattern could be produced by the geometry of the light source itself (i.e. by using an elliptical LED to produce an elliptical light pattern) so that the light sources 25 would not have to be horizontally offset from the controls 20 that they illuminate.

The foregoing description of the preferred embodiments of the invention have been presented for purposes of illustration and description, and are not intended to be exhaustive or to limit the invention to the precise forms disclosed. The descriptions were selected to best explain the principles of the invention and their practical application to enable other skills in the art to best utilize the invention in various embodiments and various modifications as are suited to the particluar use contemplated. It is intended that the scope of the invention not be limited by the specification, but be defined by the claims set forth below.

What is claimed is:
1. A control illumination apparatus, comprising:
   an arm rest;
   at least one control disposed within the armrest;

a movable cover connected to the arm rest and positionable over the at least one control; and at least one light source connected to the cover; wherein the at least one light source illuminates an exterior surface of the at least one control with the cover in an open position.

2. A control illumination apparatus, as recited in claim 1, wherein the at least one light source is integral with the cover.

3. A control illumination apparatus, as recited in claim 1, wherein the at least one light source is generally aligned with an opening formed in a bottom surface of the cover.

4. A control illumination apparatus, as recited in claim 1, wherein the at least one light source is positioned within an opening formed in a bottom surface of the cover.

5. A control illumination apparatus, as recited in claim 1, wherein the at least one light source is a direct light source that projects a predetermined light pattern onto the exterior surface of the at least one control.

6. A control illumination apparatus, as recited in claim 5, wherein the at least one direct light source is a light emitting diode.

7. A control illumination apparatus, as recited in claim 5, wherein the predetermined light pattern is elliptical.

8. A control illumination apparatus, as recited in claim 5, wherein the at least one direct light source is horizontally offset from the at least one control such that an axis of illumination of the at least one direct light source forms a predetermined angle from vertical.

9. A control illumination apparatus, as recited in claim 8, wherein the predetermined angle is approximately 45 degrees from vertical.

10. A control illumination apparatus, as recited in claim 8, wherein the predetermined angle is between 35 and 55 degrees from vertical.

11. A control illumination apparatus, as recited in claim 5, further comprising:

a plurality of direct light sources connected to the cover; and a plurality of controls; wherein the plurality of direct light sources project overlapping predetermined light patterns onto exterior surfaces of the plurality of controls.

12. A control illumination apparatus, as recited in claim 11, wherein the predetermined light patterns are elliptical.

13. A method for illuminating a set of controls, comprising the steps of:

providing an arm rest, the set of controls being disposed within the arm rest;

connecting a movable cover to the arm rest, the cover being positionable over the set of controls;

providing at least one light source connected to the cover; and illuminating an exterior surface of the set of controls with the at least one light source with the cover in an open position.

14. A method for illuminating a set of controls, as recited in claim 13, wherein the at least one light source is a direct light source that projects a predetermined light pattern on the exterior surface of the set of controls.

15. A method for illuminating a set of controls, as recited in claim 14, further comprising the step of aligning an axis of illumination of the at least one direct light source with the set of controls such that the axis of illumination forms a predetermined angle from vertical.

16. A method for illuminating a set of controls, as recited in claim 15, wherein the predetermined angle is between 35 and 55 degrees from vertical.

17. A method for illuminating a set of controls, as recited in claim 14, wherein the predetermined light pattern is elliptical.

18. A method for illuminating a set of controls, as recited in claim 14, further comprising the steps of:

providing a plurality of direct light sources connected to the cover; and aligning the plurality of direct light sources such that the plurality of direct light sources project overlapping predetermined light patterns onto the exterior surfaces of the set of controls.

19. A method for illuminating a set of controls, as recited in claim 18, wherein the predetermined light patterns are elliptical.

* * * * *